United States Patent [19]
McElroy et al.

[11] Patent Number: 5,421,102
[45] Date of Patent: Jun. 6, 1995

[54] NON-CONTACTING DRYING SYSTEM

[75] Inventors: Lucian G. McElroy, Metamora; Alexander B. Faytlin, Oak Park; John Miller, Oxford, all of Mich.

[73] Assignee: Proto-Vest, Inc., Oxford, Mich.

[21] Appl. No.: 187,214

[22] Filed: Jan. 26, 1994

[51] Int. Cl.⁶ .............................................. F26B 21/06
[52] U.S. Cl. ..................................... 34/541; 15/316.1; 15/319; 34/666
[58] Field of Search ................. 34/666, 201, 202, 541, 34/526, 565; 15/312.1, 312.2, 319, 316.1

[56] References Cited

U.S. PATENT DOCUMENTS

| | | | |
|---|---|---|---|
| 4,446,592 | 5/1984 | McElroy | 15/316 R |
| 4,589,160 | 5/1986 | Day et al. | 34/243 C |
| 4,817,301 | 4/1989 | Belanger et al. | 34/243 C |
| 4,893,229 | 1/1990 | Detrick | 34/243 C |
| 4,934,018 | 6/1990 | Fortier et al. | 34/243 C |
| 4,949,423 | 8/1990 | Larson et al. | 34/243 C |
| 5,184,369 | 2/1993 | McElroy | |
| 5,187,881 | 2/1993 | McElroy | 34/243 C |
| 5,189,754 | 3/1993 | Sauter | 34/243 C |

*Primary Examiner*—Denise L. Gromada
*Attorney, Agent, or Firm*—Reising, Ethington, Barnard, Perry & Milton

[57] ABSTRACT

A drying apparatus (10) for a vehicle wash system maintains blower air bags (18) at a predetermined distance from the vehicle providing forced air against the vehicle for water removal. Ultrasonic sensors (66) are provided on the nozzles (26) of the bags (18) for sensing objects within a predetermined distance. Control circuitry (40) controls a motor (42) to control movement of the air bags (18) to maintain the predetermined distance. The wiring interconnecting the control circuitry and motor (38) and sensor (66) extends through the interior of the air bags (18) and support air plenum (13, 14) to avoid damage thereto. The control circuitry (40) allows for manual adjustment of the sensitivity of the sensors (66). The circuitry in the sensors (66) is minimized to only the transmitter, receiver and amplifier. Furthermore, each bag (18) is controlled by separate control circuitry (40) so that failure of one air bag and associated circuit does not effect any other bag's operation.

17 Claims, 5 Drawing Sheets

NON-CONTACTING DRYING SYSTEM

TECHNICAL FIELD

The invention relates to an apparatus for controlling movement of one member with respect to a moving object to maintain a predetermined distance, and more particularly, to the sensing of the proximity of a vehicle and adjusting the position of the blower air bag in response thereto.

BACKGROUND OF THE INVENTION

Car wash systems generally include drying stations which utilize flexible inflatable bags for removing fluid from the vehicle's surface to dry the vehicle. It has become desirable to eliminate contact with the vehicle by providing a proximity sensor to sense the location of the vehicle with respect to the nozzle and maintain a predetermined distance therebetween.

Automotive car drying systems have utilized ultrasonic sensors to sense the distance to the vehicle from the dryer system. See for example, U.S. Pat. No. 5,184,369, issued Feb. 9, 1993, in the name of McElroy et al, assigned to the assignee of the subject invention. Such a system utilizes ultrasonic sensors located on the bag nozzle for sensing the distance to the vehicle. The sensor transmits information to a control circuit which controls via a motor the movement of the air bags. The subject invention provides improvement of the patented system.

SUMMARY OF THE INVENTION

The invention includes an apparatus for directing fluid to the surface of an object as the object is conveyed relative to the apparatus along a path. The apparatus comprises support means, the support means includes fluid plenum means for providing an interior chamber for communicating the fluid. A distributing member is movably connected to the support means for directing fluid from the fluid plenum means to the object and has an interior for communicating the fluid from the fluid plenum to the object. Actuator means is operatively connected to the distributing member for moving the distributing member with respect to the object. Control means is operatively connected to the actuator means for sensing the distance to the object and for controlling actuator means to position the fluid directing member based on the sensed distance. The apparatus is characterized by conductor means interconnecting the control means and actuator means and extending through interior chamber of the fluid plenum.

The invention also includes sensor means connected to the moveable member for sensing the distance to the object and for producing a sensed signal indicative of the distance to the object. Processing means is operatively connected to the actuator means for receiving the sensed signal and for controlling movement of the actuator means. The apparatus is characterized by the sensor means comprising transmitter means for transmitting an ultrasonic signal, receiver means for receiving an echo signal from reflection of the ultrasonic signal from the object producing a receiver signal, and amplifier means for receiving and amplifying the receiver signal to produce the sensed signal, the processing means located remote from the sensor means and including conductor means connected between the sensor means and the processing means for communicating the sensed signal to allow control of the actuator means.

The invention also includes at least two air directing members with associated sensors and actuator means. The apparatus is characterized by including at least two separate and independent processing means for each of the air directing members to independently receive the sensed signal and to control the actuator means so that upon failure of one of the processing means the remaining processing means continues to operate.

The invention also includes the control means sensing the distance to the object by ultrasonic waves to control the actuator means. The control means includes delay means for receiving the sensed signal and disabling the control means for a variable time delay from transmission of the ultrasonic signal to control the actuator means based on an echo ultrasonic signal preventing control based on the transmitted ultrasonic signal propagated through the sensor.

The invention includes the control means including sensitivity adjustment means for allowing adjustment of attenuation level to prevent reception of undesirable signals and to allow response to an echo of the ultrasonic signals off the object.

FIGURES IN THE DRAWINGS

Advantages of the present invention will be readily appreciated as the same becomes better understood by reference to the following detailed description when considered in connection with the accompanying drawings wherein.

DESCRIPTION OF THE PREFERRED EMBODIMENT

Figure 1:
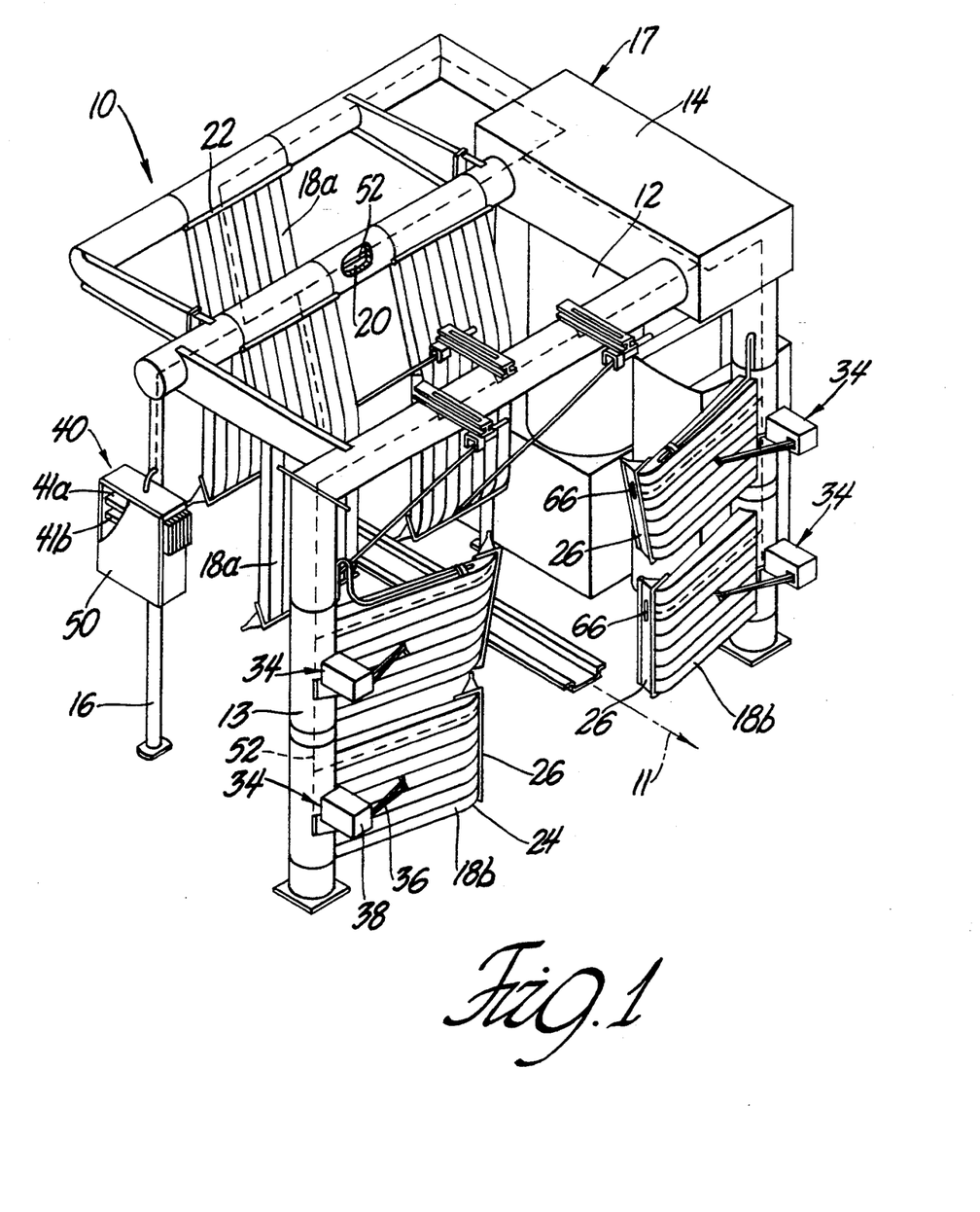
FIG. 1 is a perspective view of the drying apparatus of a car wash system constructed in accordance with the subject invention.

Referring to the drawings, a drying station or apparatus of a vehicle washing system is generally shown at 10 in FIG. 1. The drying apparatus 10 is constructed for stripping fluid from the surface 15 of the vehicle as the vehicle is conveyed along a path 11 through a car wash system. It is to be understood that the apparatus 10 may be used to strip liquid or material from any type of surface and is not limited to vehicles, or to deliver air to the object at given distances for cooling or any other operation. Furthermore, it is to be understood that the control circuitry may be adapted to any apparatus for maintaining distance with respect to an object 15.

Relative movement is provided between the surface and the apparatus 10. The drying apparatus 10 includes a support means or an air distributor 17 comprising a fan or blower system 12, side ducts or plenums 13, and an overhead duct or plenum 14. Beams 16 along with the side ducts 13 may be used to support the overhead plenum 14 from the floor of the car wash.

The drying apparatus 10 further includes a plurality of air distributor members or flexible bags 18, each having a generally rectangular transverse cross section. The apparatus 10 includes a plurality of vertically hanging bags 18a and substantially horizontally disposed bags 18b. The bags 18 are supported by the air distributor plenum 13, 14 in an array along the path of a vehicle passing through the drying apparatus in order to strip fluid from the top and side surfaces of the vehicle. Each of the bags 18 includes a bag inlet end 22 connected to the plenum 13, 14 for introducing air under pressure into the bags 18, and an outlet end 24 spaced from the inlet end 22. The bags 18 include nozzle members 26 connected at the outlet end 24 to concentrate the fluid flow to the surface 15, which are substantially the same as disclosed in U.S. Pat. No. 4,446,592 discussed in the Background of the Invention and incorporated by reference herein. Furthermore, the bags in orientation is substantially as set forth in U.S. Pat. No. 5,184,369, discussed in the Background of the Invention and incorporated by reference herein.

The bags 18 are pivotally connected to the air distributor plenum 13, 14 by means as commonly known in the art, and as set forth in the referenced U.S. Pat. No. 5,184,369.

The plenum 13, 14 provides a path to direct the fluid or air. The plenum 13, 14 has an interior chamber 20 for communicating the air therethrough, and includes an exterior. The interior chamber 20 is in communication with the pressure generator 12 for distributing the pressurized air. The interior chamber 20 of the plenum 13, 14 is in communication with an interior channel 22 of the bags 18 for allowing the pressurized air to directed out of the nozzle 26.

The apparatus 10 includes actuator means 34 connected between the distributor plenum 14 and the bag 18 for moving the bag 18 toward and away from the vehicle. The actuator means 34 includes a link or cord 36 connected to the bag 18 for controlling movement thereof, and retracting means 38 connected to the link 36 and responsive to a control signal for actuating the link 36 to position the bag 18 a predetermined distance from the vehicle. Control means 40 is operatively connected to the actuator means 34 for receiving the control signal to control movement of the actuator means 34. More specifically, the retraction means 38 includes a motor operatively connected to the link 36, as set forth in the referenced U.S. Pat. No. 5,184,269. The link 36 may be removably attached to the bag 18 and motor 38 for allowing separation of the bag and the cord as also set forth in the reference U.S. Pat. No. 5,184,369.

The control means 40 includes a plurality of sensor means 66 fixedly connected to the bags 18 for sensing the presence of the vehicle and therefore the distance to the vehicle and for producing a sensed signal. The control means 40 also includes processing means 41 for receiving signals from the sensor means 66 and controlling the motor 38 to control movement of the bag 18.

In general, two or more sensor means 66 are utilized on a bag 18 to allow sensing a target from a wide angle of view. The multiple sensors 66 on each bag to ensure that the sensor 66 will read the vehicle echo signal irrespective of orientation of the bag 18 to the vehicle. Therefore, sensors 66 are positioned on the front and back sides of the nozzle 26. Each of the sensor means 66 is designed identical as will be subsequently discussed.

Each of the bags 18 includes at least one sensor means 66 positioned thereon. It is possible to pace any number of the sensor means 66 on various locations of the nozzle, depending on the angle of view desired. For example, the sensor means 66 may be placed as follows. With regard to the overhead or vertical bags 18a, sensor means 66 are placed on both sides of the nozzle, the front and rear side. The left overhead bag 18a, has the sensor 66 located near the center of the nozzle 26, and the right overhead bag 18a has the sensor 68 located at the extreme left side of the nozzle to compensate for smaller width vehicles. The horizontal bags 18b have two front sensors aligned with the wheel well and mirror, and one rear sensor 66. On the left side, the upper left bag has one front and one rear sensor, and the lower bag has two front and one rear sensors 66 positioned as in the right side.

The sensor means 66 includes housing means 72. The housing means 72 comprises a generally triangular shape providing a face 76, a rear side and an open side (not shown). The sensor face 76 is generally in the direction of the nozzle 26 and directed toward the vehicle 15. The sensor face 76 includes a transmitter aperture 80 and two receiver apertures 82, 83. The transmitter aperture 80 is centered between the two receiver apertures 82, 83 with spacing therebetween. Projecting from the sensor face 76 between the apertures 80 82, 83 are a plurality of barriers 84 for blocking transmission from the transmitter directly to reception by the receiver through the air outside the housing means 72. The sensor housing 72 and barriers 84 are of the type discussed in the referenced U.S. Pat. No. 5,184,369 The rear side is enclosed. The open side allows for insertion of the sensing circuitry 106, as subsequently discussed, and connection against the nozzle 26 to seal the sensor means 66 therein to prevent contamination of the circuitry.

Figure 2:
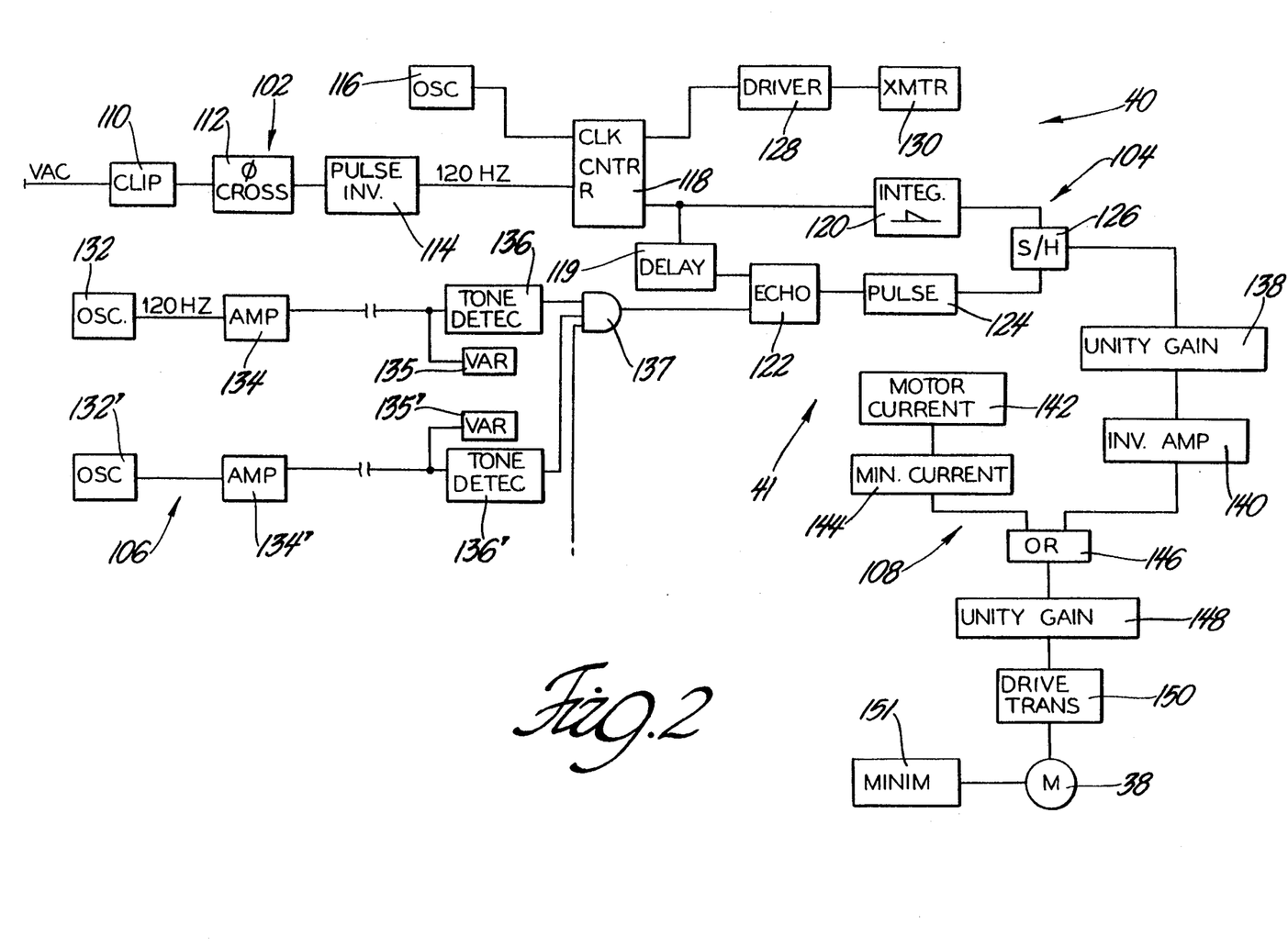
FIG. 2 is a block diagram of the control means of the subject invention.

The control means 40 is generally indicated in FIG. 2 and controls the actuator means 38 and the distance of the bag 18 from the vehicle. The sensor means 66 includes the circuit means 106 within the housing means 72. The processing means 41 is generally comprised of timing means 102, supervisory means 104, and motor means 108. Each of the bags 18 has an independent and separate control means 40 associated therewith which operates its respective actuator means 38. This allows for redundance in the apparatus 10 such that if one control means 40 fails, the apparatus 10 may still operate the remaining bags 18 without the entire apparatus 10 failing. Each of the processing means 41 is located in a control enclosure 50 connected to the support beams 16. The control enclosure 50 is removed from concentrated and immediate contamination, remote from the sensor means 66, and is generally connected to a support beam 16.

Conductor means 52 extends between the sensor means 66, the motor 42, and each of the processing means 41. The conductor means 52 extends within the interior chamber 20 of the plenum 13, 14 and within the interior of the air bags 18 such that the conductors or wires are not exposed for contamination and damage. The conductor means 52 comprises insulated wires extending between associated processing means 41 and motors 38, and associated processing means 41 and sensors 66.

Each of the control means 40 is associated with a single bag. On a single bag, the control means 40 operates all of the sensors 66 when more than one is utilized. Each of the outputs of the sensors 66 for a single bag 66 are AND'd together to provide a single output as subsequently discussed.

The control means 40 is hereinafter described for a single bag, but is to understood that there exists a control means 40 for each bag utilized, i.e., when 7 bags are utilized as shown, there are seven independently operated control means 40.

The timing means 102 provides the timing information for all of the sensor means 66 on a single bag and for the associated control means 40. The supervisory means 104 provides the control for the bag, i.e., the control of the associated motor 38. The sensing means 106 is located within each sensor 66 and operates in conjunction with the supervisory means 104 for sensing the distance of a bag 18 of the vehicle. The motor means 108 is responsive to the supervisory means 104 to control operation of the motor 38 for retracting the bag 18 when desired.

As illustrated in FIG. 2, the timing means 102 receives an analog voltage signal, i.e., 24 volts AC from a transformer, and includes clip means 110 for clipping the amplitude to a predetermined amplitude of the analog signal. The clipping means 110 produces an amplitude analog control signal which is received by a zero cross detector 112 which detects each zero crossing to produce a positive going pulse. The pulse is received by a pulse invertor means 114 which inverts the pulse producing a negative going pulse at 120 Hz as a timing signal. The inverted pulse signal is received by the supervisory means 104.

The supervisory means 104 includes oscillating means 116 for producing a clock signal of 640 KHz. A ripple counter 118 receives the clock signal and the timing signal comprising the inverted pulse to produce a transmit signal and a reset signal. The counter 118 produces the transmit signal at 40 KHz for eight pulses for each timing signal pulse and the reset signal is produced at a divide by sixteen output wherein a pulse is produced for the reset signal for the last four or the eight pulses of the transmit signal. The supervisory means 104 includes an integrator 120 for receiving the reset signal and initiating a distance ramp which establishes amplitude verses time.

A delay circuit 119 receives the reset pulse and further delays production of an enable pulse for a variable time. For example, the delay of the enable pulse may be for the last four pulses of the transmit signal, and for four pulses thereafter. A tone detector 136 for each sensor 66 on a bag is tuned to 40 KHz, the same as the transmitted signal. The tone detectors 136 receive the sensed signals from the sensing means 106 and produces a receive signal which is AND'd 137, and a single receiving signal is sent to the echo detector 122 to initiate the distance sensing. Variable sensitivity means 135 is connected to each of the tone detector 136 for allowing manual adjustment of the sensitivity of the sensor 66. The echo detector 122 receives the disable signal to reset itself to wait and enables it to detect the echo and receiver signal representing the echo to produce a set signal upon reception of the receiver signal. A pulse formatter 124 formats the output of the echo detector 122 to produce the set signal in the form of a pulse. Distance means (sample/hold) 126 receives the set signal and compares same to the distance ramp to produce a control signal indicative of distance of the bag 18 from the vehicle. The distance ramp is initiated at the time of the transmission of pulses to the vehicle and starts high and decrement magnitude or voltage proportional to time. The set signal represents the time for reception of the reflected transmission. And therefore comparison to the ramp is indicative of the time delay representing the distance to the vehicle.

The sensing circuit means 106 includes driver means 128 for receiving the transmit signal and producing ultrasonic transmissions through transmitter 130 of the eight pulses it receives at the 40 KHz. The sensing circuit 106 also includes receiver oscillator means 132 for producing a receiver timing signal at a similar 40 KHz. The receiver effectively looks during a 2.8 ms time window to receive the echo due to the enabling and disabling of the delay circuit 119. The receiver timing signal is amplified by amplifier 134 and produces the sensed signal which is communicated to the processing means 41. Only this circuitry of driver/transmitter, receiver, amplifier are placed is the sensor 66, and communicates the sensed signal via conductors or wires 52 to the remaining control means 40 at enclosure 50.

The motor means 108 receives the control signal by a unity gain amplifier 138 which is then sent to an offset inverting amplifier 140. The inverting amplifier 140 produces the magnitude distance signal. Also included is a current monitor 142 for monitoring the current drawn by the motor 38. A current integrator 144 receives the current magnitude from the motor current monitor 142 and produces a minimum signal when the current is below a predetermined limit. OR'ing means 146 receives both the magnitude distance signal and the minimum signal and passes the greater of the two signals. The passed signal is amplified by a unity gain amplifier 148 and is communicated to drive means 150 to in turn drive the motor 38. The minimum signal is provided to maintain the cord 36 taut.

The motor 42 also includes speed control means 151 for controlling the speed of the motor during unwinding. The speed control means 151 limits the speed of unwinding to a maximum value so that the bag 18 does not simply free fall.

Figure 3:
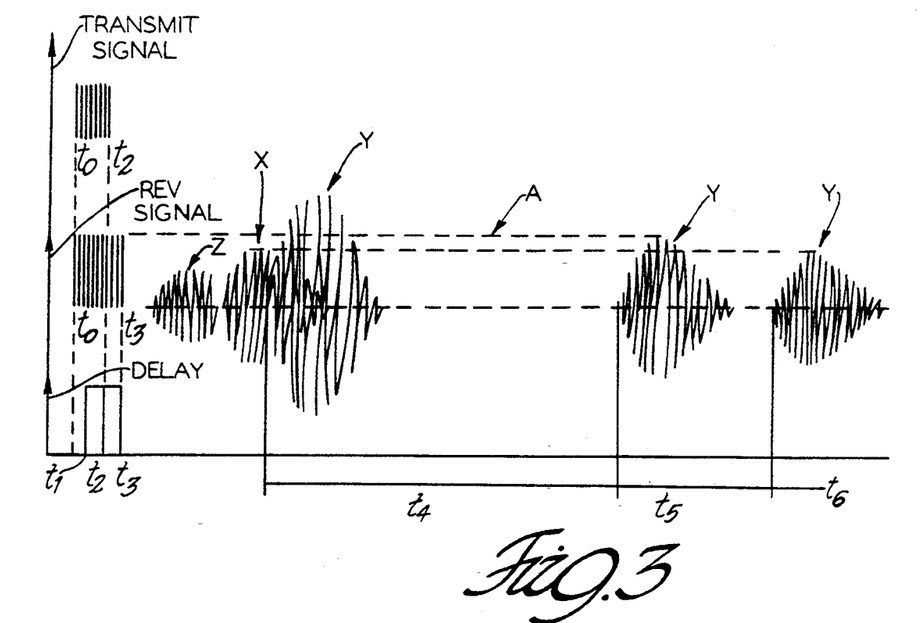
FIG. 3 is a timing diagram of waveform verses time of transmitted and received signals.

In operation, when a vehicle is passing through the apparatus 10, the air distributor 12, 13, 14 is operated, while the control means 40 is continually powered. The timing means 102 produces a timing signal which is received by the supervisory means 104. The supervisory means 104 produces the transmit signal which is received by the sensors 66 for periodic transmission. The reset signal is produced periodically and upon reception by the receiver, the received or sensed signal is received by the tone detector 136. The variable sensitivity means 135 allows manual adjustment of the effective sensitivity of the sensor means 66. In other words, the variable sensitivity means 135 allows adjustment of the level of attenuation of the sensed or received echoes. As illustrated in FIG. 3, the line of attenuation A is set so that the circuit will respond to only echoes above a value so that echoes X from the nozzle or crossover Z will not be acted upon. (See also FIG. 4). No further operation takes place until the echo detector 122 receives the enable signal from the delay means 119.

Figure 4:
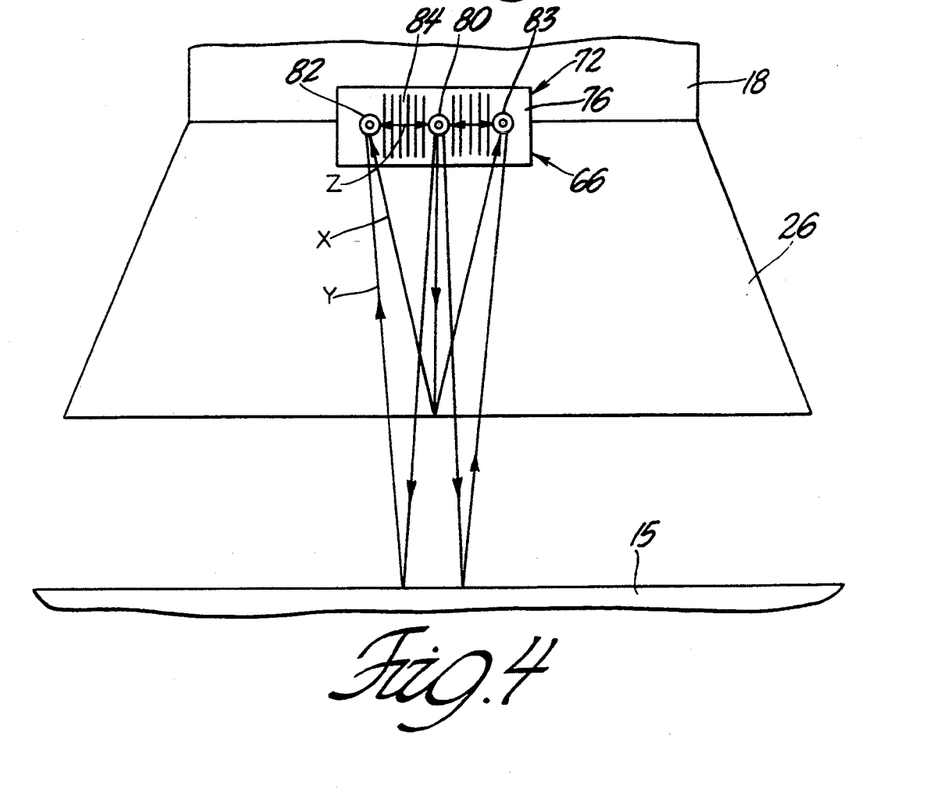
FIG. 4 is a representative diagram of the echo wave and the sensor.

The delay circuit 119 allows improper received signals to be ignored until the appropriate time. The receiver oscillator 132 tends to product a received signal substantially simultaneous with the transmitter 130 producing the transmission, and this signal must be ignored. Upon a sensor 66 detecting a surface of the vehicle passing within a predetermined distance, the echo signal is produced which in turn will control the height or distance from the vehicle of the respective bag 18.

FIGS. 3 and 4 illustrate the timing of transmitted and received signals, and the echo waveforms produced in the apparatus 10. The sensing circuit 106 should respond only to the echo signals Y from the surface 15 of the vehicle or object. Therefore, the variable sensitivity means 135 allows adjustment of the line of attenuation A to eliminate crossover Z or nozzle echo X. The delay means 119 aids in adjustment of the variable sensitivity means 135 and response of the processing means 41 to the vehicle echo signals Y. The delay means 119 ignores the eight pulses or more from the sensing circuit 106 from time t(0)-t(3), which is the time the receiver simultaneously produces signals in direct response to the transmissions directly through the plastic housing 72. After time t(3), approximately on the order of 200-300 us, the transmitter 130 has ceased transmitting and the receiver has ceased responding thereto.

Adjustment of the sensitivity means 135 is accomplished by use of a variable resistor R175 and diode D100 at the processing means 41 (FIG. 5a), and more specifically in conjunction with the tone detector 136. In normal operation Without a vehicle in the apparatus 10, the LED remains dark. If there is change and the LED D100 is flashing, there is more noise and the resistor R175 must be adjusted until dark. When a vehicle is in the apparatus 10, the LED D100 should be operating evenly in between dark and light.

When a vehicle echo or reflection Y is received, the supervisory means 104 detects the distance to the vehicle. The motor driver means 108 receives the detected distance to the vehicle and when less than a predetermined amount, energizes the motor 42 to maintain the predetermined distance. The motor 42 is released or deenergized when the detected distance is greater than the predetermined distance, wherein the weight of the bag 18 unwinds the cord 36 from the motor 42.

When the sensor signal is low, the motor means 108 maintains a minimum current to the motor 42 to hold the cord 46 taut. This is beneficial in the case where a person retracts the bag manually or by other means, the motor 42 will also retract the cord 36 to prevent any type of entanglement with other obstacles. Upon release of the bag 18, the bag 18 will be allowed to fall to its original position or most extended position.

The supervisory means 104 on each bag receives all these sensor signals and controls the motor means 108 in response thereto. Therefore, each of the bags 18 is controlled independently of the other bags. Each bag 18 will maintain a predetermined distance to the vehicle and obstacles detected in the path without contact thereof.

Figure 5A:
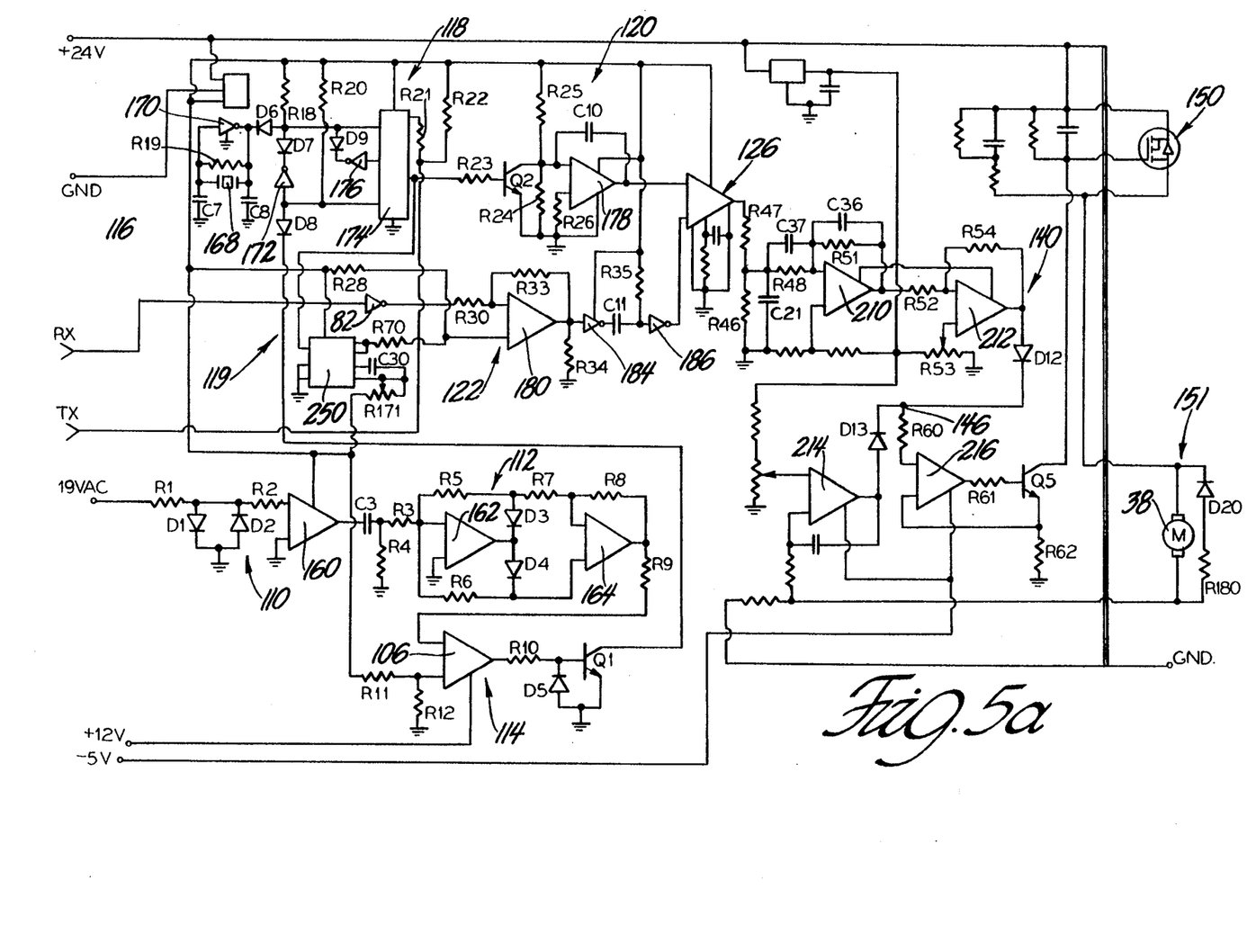
FIG. 5a-b are schematic diagrams of the detail of FIG. 2.
Figure 5B:
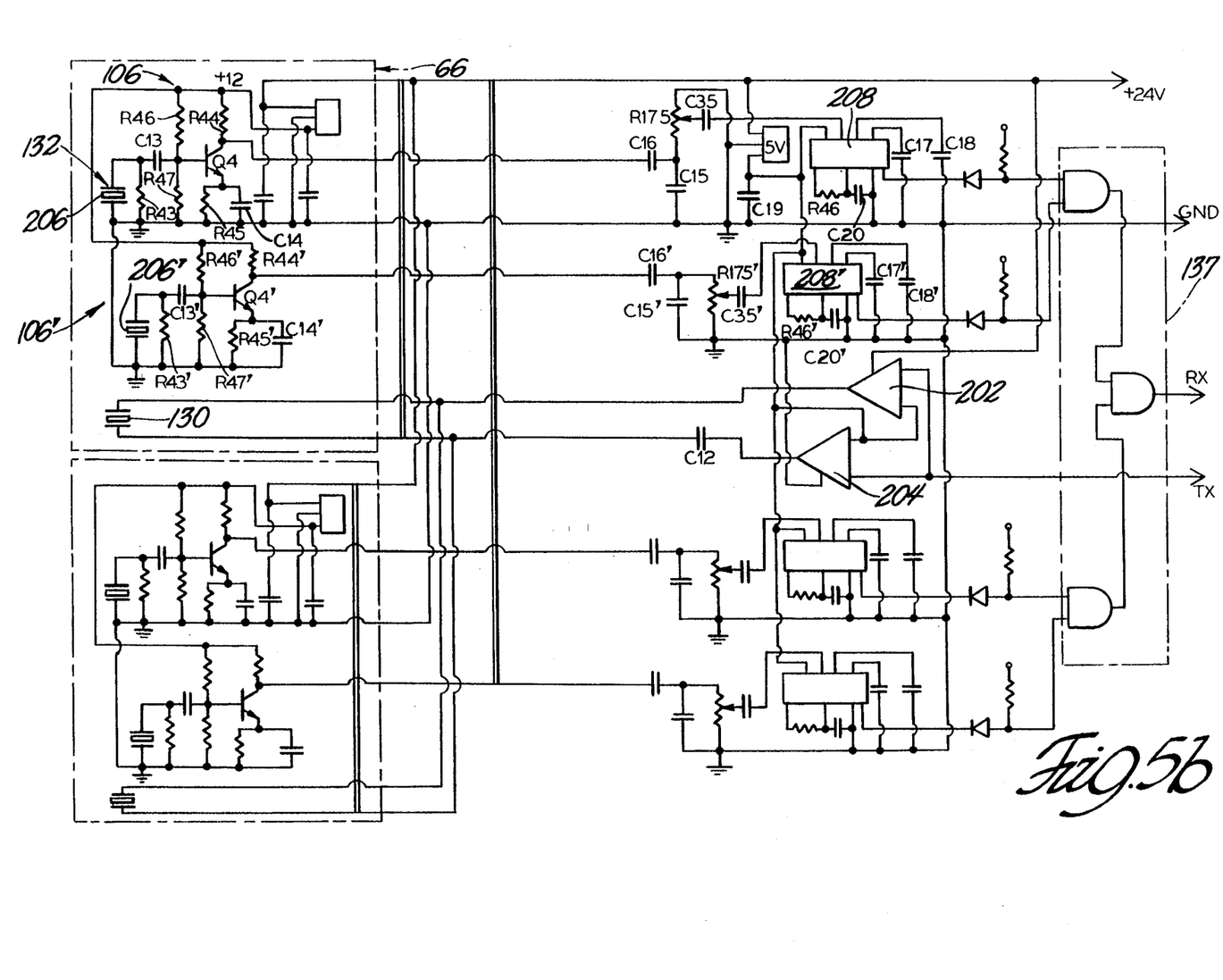

FIGS. 5a-5b illustrates the detailed schematic diagram of the control means 40. The timing means 102 receives a 24 volt analog power signal. It is to be understood that suitable voltage regulators may be used to produce the other power levels indicated in the schematics. The analog power signal is received by the schematics. The analog power signal is received by the clipping means 110 which comprises a resistor R1 in series with the power source and connected to a pair of parallel opposite polarity diodes D1, D2 which are connected to ground. A resistor R2 is connected to the diode D1, D2 and to the noninverting input of operational amplifier 160 having its inverting input grounded. The output signal is derivative by capacitor C3 and a resistor R4 is connected to ground and to resistor R3 which is connected to the rectifier 112. The rectifier 112 comprises an operational amplifier 162 having its inverting input connected to resistor R3 and its noninverting input connected to ground with feedback to the inverting input through reverse bias diode D3 to resistor R5 and through forward bias diode D4 through resistor R6.

The D3, R5 connection is connected to resistor R7 and connected to the inverting input of a second operational amplifier 164 wherein the noninverting input is connected to the D4, R6 connection. Feedback is provided through resistor R8 to the inverting input. The output of the operational amplifier 164 is connected through resistor R9 producing the positive going pulse upon each zero crossing of the analog signal. The comparator 114 receives the positive going pulse to produce a rectangular pulse producing the timing signal. The pulse inverting means 114 comprises an operational amplifier 106 receiving the positive going pulse at its noninverting inputs and has its inverting input connected to a voltage divider circuit comprising resistors R11 and R12. The output of the operational amplifier 166 is connected through resistor R10 to a grounded reverse bias diode D5 and to drive a transistor Q1 at its base producing the timing signal at its collector.

The supervisor means 104 includes the oscillator means 116 comprising a crystal oscillator 168 connected between two grounded capacitors C7, C8. Parallel with the crystal oscillator 168 is a resistor R19 and parallel therewith is invertor 170. The output of the invertor 170 is connected through a diode D6 to resistor R18 to power, and to diode D7 to an invertor 172 to the timing signal. This produces the clock signal of 640 KHz. The timing signal is received by a reverse biased diode D8 and connected through resistor R20 to power and to the input of the ripple counter 118. The ripple counter 118 comprises a ripple binary counter 174 of the type national semiconductor CD4020BCN. The ripple counter 174 receives at pin 10 the clock signal and at pin 11 the timing signal. Pin 13 is connected through invertor 176 to diode D9 to the clock signal. Power is supplied to pin 16 and ground is provided at pin 8. The counter 174 produces the transmit signal through resistor R21, which is also connected to resistor R22 to positive voltage. The pin 6 output produces the reset signal.

The integrator means 120 receives the reset signal and comprises a resistor R23 connected to the base of transistor Q2 having its emitter grounded and its collector connected to voltage divider comprising R24 to ground and R25 to voltage. The collector signal is received at the inverting input of an operational amplifier 178 having feedback therethrough through capacitor C10, with its noninverting input connected through resistor R26 to ground. The output of the operational amplifier 178 produces the ramp signal.

The reset signal is also received by the delay means 119 comprising delay integrated circuit 250 at pin 13 of the type CD4001. Pins 11, 12 provide the enable signal through resistor R70 to the echo detector 122. A variable resistor R171 is connected to pin 9 and to pin 11 through capacitor C30. The opposite side of the variable resistor R171 is connected to power.

The enable signal is received by the echo detector means 122 which is connected to resistor R70 receiving the reset signal and connected to resistor R28 to power and the inverting input of operational amplifier 180. The receiver signal is received by resistor R30 through invertor 182 to the noninverting input of the operational amplifier 180. Feedback is provided through resistor R33 to the noninverting input. The output of the operational amplifier 180 is connected by resistor R34 to ground, and invertor 184 through capacitor C11 with resistor R35 connected to power and to invertor 186 to the distance means 126. The distance means 126 includes a sample/hold circuit which receives both the set signal and the ramp signal for producing an output indicative of the point on the ramp at the occurrence of the set signal in time. The occurrence signal is sent to the unity gain 138 of the motor means 108 subsequently described.

The transmitter driver means 128 receives the transmit signal and comprises two drive operational amplifiers 202, 204 wherein the first operational amplifier 202 receives power at its inverting input and receives transmit signal at its noninverting input, and the second operational amplifier 204 is configured as the first with an output capacitor C12 at its output, both connected to an output transmitter 130. The transmitter 130 is located at the transmitter aperture 80 in the sensor housing 68. The sensor is of the type ultrasonic sensor MA series by MURATA MFG. CO. There exists a transmitter 130 and driver 128 for each sensor 66 on the bag, i.e., two sensors 66 for a bag is illustrated.

The receiver includes the oscillator 132 comprising a crystal oscillator 206 parallel with the grounded resistor R43, and connected to a series capacitor C13 and to the base of transistor Q4 providing the amplifier 134. A resistive divider circuit comprising resistors R46, R47 are connected at the base between power and ground. The collector is connected through resistor R44 to positive voltage and the emitter is connected through parallel resistor capacitor R45, C14 to ground. The collecter provides the sensed signal which is transmitted to the tone detector 136 of the processing means 41.

The sensitivity means 135 and tone detector 136 receives the signal by a parallel capacitor C15 for attenuation and to a coupling capacitor C16. The variable resistor R175 comprising part of the sensitivity means 135 is connected to the capacitor C16 and to a second coupling capacitor C35. Capacitor C35 is connected to the input of the tone detector means 136. The tone detector means 136 comprises a tone decoder 208 of the type of National Semiconductor LMC567, low power tone decoder. The tone detectors 208 require so many cycles to be detected to lock on the phase. Two capacitors C17, C18 are provided as an output filter and loop filter, and power and a capacitor C19 are provided at pin 4 as a voltage source. The timing of the decoder 208 is provided at pins 5, 6 and 7 through resistor R46 and capacitor C20. Output is provided at pin 8 providing the receiver signal through LED D100. When the tone is detected, the receive signal goes to ground. As previously indicated, each of the sensing means 66 comprises the two receivers. Therefore, the second receiver 132' is configured identical to the first receiver wherein primed numerals indicate similar parts. Both of the signals from the tone detectors 208, 208' are combined to provide the sensed signal, which are AND'd 137 and sent to the echo detector 122.

The motor means 108 receives the control signal by the unity gain amplifier 138 which comprises grounded voltage divider resistors R47 and R476 on the input line, and a series resistor R48 to the inverting input of operational amplifier 210 having its noninverting input connected to a voltage divider comprising resistors R49 and R50. A capacitor C21 is connected across the resistor R476. Feedback to the inverting input is provided through resistor R51. A capacitor C36 is connected across the resistor R51, and capacitor C37 is connected across resistor R48. The output of operational amplifier 210 is provided through resistor R52 to the inverting input of operational amplifier 212 having its noninverting input connected to a variable resistor R53 which allows variation in the predetermined distance which the nozzle 26 is maintained to the surface 15. Feedback to the inverting input is provided through resistor R54. The output of operational amplifier 212 is fed through a diode D12 providing the magnitude distance signal. The operational amplifier 212 comprises the inverting amplifier means 140.

The motor current monitoring means 142 and minimum current 144 comprise a resistor R56 for monitoring the current draw on the motor which is connected through the resistor R57 to the inverting input of operational amplifier 214. The noninverting input is connected to a variable resistor R58 and fixed resistor R59 to allow variation on the link tension by the motor 38. Feedback is provided to the inverting input through capacitor C22. The output of the operational amplifier 214 through diode D13 provides the minimum signal. The diode D12 and D13 provide for an O-ring circuit 146 wherein the highest signal is sent to the unity gain amplifier means 148. The unit gain amplifier means 148 comprises an operational amplifier 216 having its noninverting input connected to the resistor R60 receiving the OR'd signal and its inverting input connected in unity gain follower feedback to the emitter of a transistor Q5. The output of the operational amplifier 216 is fed through resistor R61 to the base of transistor Q5. The emitter of transistor Q5 is connected through resistor R62 to ground. The collector is connected to the drive transistor 150. The drive transistor 150 generally comprises a MOSFET wherein the collector of transistor Q5 is connected to the gate of MOSFET 150. The source is connected to power and the gate is connected to the motor 42. The minimum speed 151 is provided by a series diode D20 and resistor R180 connected across the motor 38 to thereby limit the speed at which the motor 38 allows unwinding of the link and dropping of the bag.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. An apparatus for directing air to the surface of an object as the object is moved relative to the apparatus along a path, said apparatus comprising:

an air distributor (17);

first and second air directing members (18) having first and second ends, each of said first ends supported by said air distributor (17) about the path of the object for receiving air under pressure from said air distributor (17), each of said second ends including a nozzle for directing air toward the object;

first and second actuator means (34) operatively connected to said first and second air directing members, respectively, for moving the second end thereof relative to the object;

first and second sensor means (66) connected to said first and second air directing members (18), respectively, for sensing the distance to the object and for producing a sensed signal for each air directing member (18), each of said first and second sensor means (66) comprising at least two sensors connected to said directing member (18), each of said sensors comprising an ultrasonic transmitter and an ultrasonic receiver;

said apparatus characterized by including first and second separate and independent processing means (41) for said first and second air directing members (18) to independently receive respective sensed signal and to control respective actuator means (34) so that upon failure of one of said air directing members and one of said processing means (41), the remaining processing means (41) continues to operate, and including a control enclosure means (50) connected to said air distributor (17) for housing said first and second processing means (41) remote and separate from said sensor means (66).

2. An apparatus for controlling the movement of a member with respect to an object comprising:

a moveable member (18) having first and second ends;

actuator means (34) operatively connected to said moveable member (18) for moving said movable member (18) with respect to said object;

control means (40) connected to said actuator means (34) for sensing the distance to the object by ultrasonic waves to control said actuator means (34);

said control means (40) including delay means (119) for receiving said sensed signal and disabling said control means (40) for a variable time delay from transmission of said ultrasonic signal to control said actuator means (34) based on an echo ultrasonic signal reflected from the object while preventing control based directly on the transmitted ultrasonic signal.

3. An apparatus as set forth in claim 2 further characterized by said control means (40) including sensor means (66) adjacent said moveable member (18) for sensing the distance to an object (15) producing a sensed signal, and processing means (41) for receiving said sensed signal and for controlling said actuator means (34).

4. An apparatus as set forth in claim 3 further characterized by said sensor means (66) including transmitter means for transmitting an ultrasonic signal and receiver means for producing said sensed signal based on reflections of said ultrasonic signal and upon occurrence of transmissions.

5. An apparatus as set forth in claim 2 further characterized by said delay means including variable adjustment means for varying the time delay so that said sensed signal produced substantially simultaneous with transmissions is ignored by said processing means (41).

6. An apparatus for controlling the movement of a member with respect to an object comprising:

a moveable member (18) having first and second ends;

actuator means (34) operatively connected to said moveable member for moving said movable member with respect to said object;

control means (40) connected to said actuator means (34) for sensing the distance to the object by transmission and reception of ultrasonic signals and for controlling said actuator means (34);

said control means (40) including sensitivity adjustment means (135) for allowing adjustment of attenuation level to prevent reception of undesirable signals and to allow response to an echo of the ultrasonic signals off the object.

7. An apparatus as set forth in claim 6 further characterized by said control means (40) including sensor means (66) adjacent said moveable member (18) for sensing the distance to an object (15) producing a sensed signal, and processing means (41) for receiving said sensed signal and for controlling said actuator means (34).

8. An apparatus as set forth in claim 7 further characterized by said sensor means (66) including transmitter means for transmitting an ultrasonic signal and receiver means for producing said sensed signal based on reflections of said ultrasonic signal and upon occurrence of transmissions.

9. An apparatus as set forth in claim 6 further characterized by said sensitivity adjustment means (135) including variation means for allowing manual adjustment of the attenuation level.

10. An apparatus as set forth in claim 9 further characterized by said sensitivity adjustment means (135) including illuminating means for visually indicating the level of noise and adjusted attenuation level.

11. An apparatus for directing air to the surface of an object as the object is moved relative to the apparatus along a path, said apparatus comprising:

an air distributor (17);

a moveable member (18) having a first end and second end connected to said air distributor (17);

actuator means (34) operatively connected to said air distributor (17) and said moveable member (18) for moving said first end relative to the object;

sensor means (66) connected to said moveable member (18) for sensing the distance to the object and for producing a sensed signal indicative of the distance;

processing means (41) operatively connected to said actuator means (34) for receiving said sensed signal and for controlling movement of said actuator means (34);

said apparatus characterized by said sensor means (66) comprising transmitter means for transmitting an ultrasonic signal, receiver means for receiving an echo signal from reflection of said ultrasonic signal from said object producing a receiver signal, and amplifier means for receiving and amplifying said receiver signal to produce said sensed signal, said processing means (41) located remote from said sensor means (66) and including conductor means (52) connected between said sensor means (66) and said processing means (41) for communicating said sensed signal to allow control of said actuator means (52).

12. An apparatus as set forth in claim 11 further characterized by including housing means (50) connected to said air distributor (17) for supporting said processing means (41), and sensor housing means separate and remote from said housing means (50) for housing and connecting said sensor means (66) to said moveable member (18).

13. An apparatus (10) for directing fluid to the surface of an object as the object is moved relative to the apparatus along a path, said apparatus comprising:

support means (17);

said support means (17) including fluid plenum means (13, 14) for providing an interior chamber (20) for communicating the fluid;

a distributing member (18) movably connected to said support means (17) for directing fluid from said fluid plenum means (13, 14) to the object and having an interior for communicating the fluid from said fluid plenum (13, 14) to the object;

actuator means (34) operatively connected to said distributing member (18) for moving said distributing member (18) with respect to the object;

control means (40) operatively connected to said actuator means (34) for sensing the distance to the object and for controlling said actuator means (34) to position said fluid directing member (18) based on the sensed distance; and said apparatus characterized by conductor means (52) interconnecting said control means (40) and said actuator means (34) and extending through said interior chamber (20) of said fluid plenum (13, 14).

14. An apparatus as set forth in claim 13 further characterized by said control means (40) including sensing means (106) located adjacent said distributing member (18) for sensing the distance to the object and producing a sensed signal.

15. An apparatus as set forth in claim 14 further characterized by said control means (40) including processing means (41) for receiving said sensed signal and for controlling said actuator means (34).

16. An apparatus as set forth in claim 15 further characterized by including enclosure means (50) connected to said support means (17) for containing said processing means (41) remote from said sensing means (106) with said conductor means (52) extending between said sensing means (106) and said processing means (41) within the interior chamber (20) of said plenum means (13, 14) and within said interior of said distributing member (18).

17. An apparatus as set forth in claim 16 further characterized by said actuator means (34) connected to said plenum means (13, 14) spaced from said control enclosure means (50) with said conductor means (52) extending from said processing means (41) to said actuator means (34) within said interior chamber (20) of said plenum means (13, 14).

* * * * *